April 5, 1932. R. E. PETERSON 1,852,789
DAMPING MEANS FOR GEAR WHEELS
Filed Sept. 19, 1928
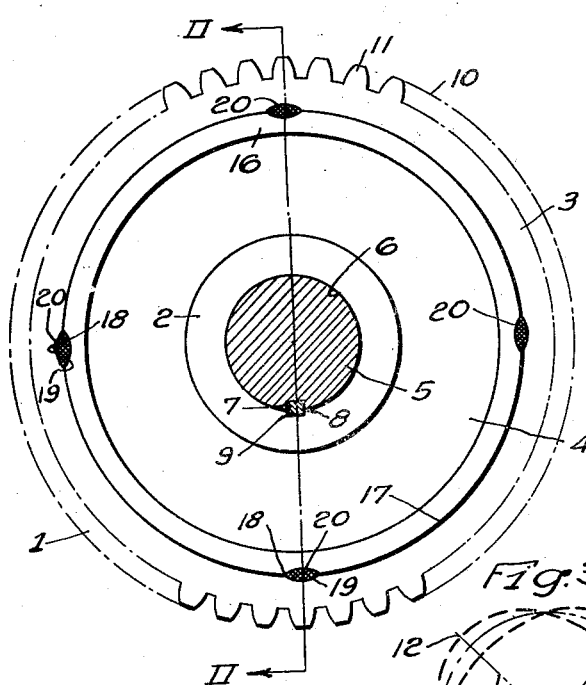
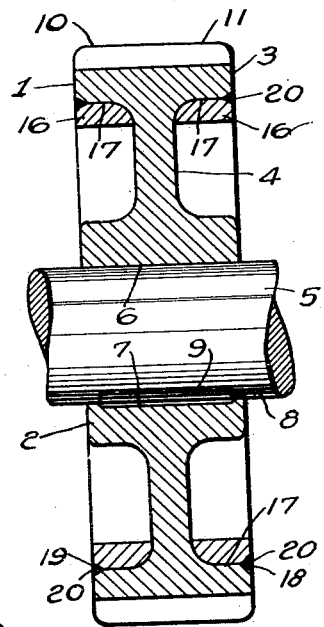
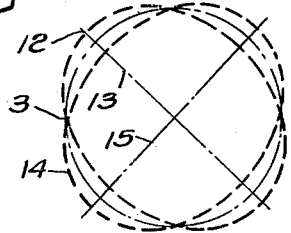
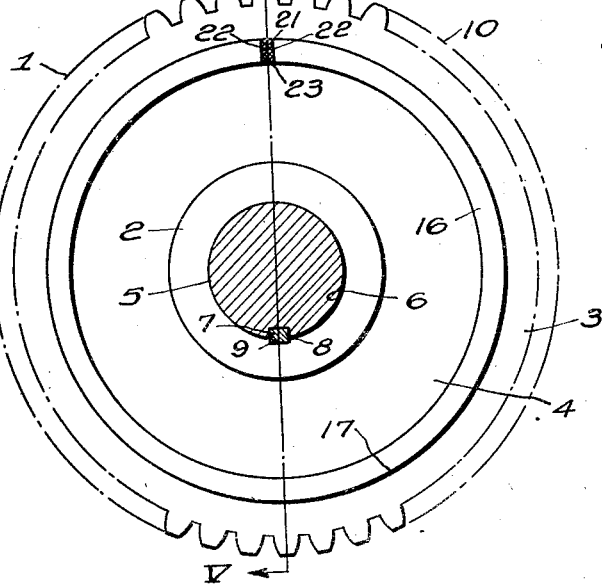
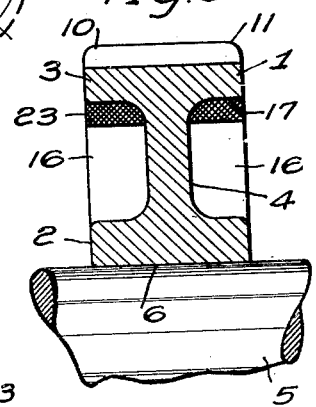
INVENTOR
Rudolph E. Peterson
BY
ATTORNEY Patented Apr. 5, 1932

1,852,789

UNITED STATES PATENT OFFICE

RUDOLPH E. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA

DAMPING MEANS FOR GEAR WHEELS

Application filed September 19, 1928. Serial No. 306,816.

My invention relates, in general, to silencing devices and, in particular, to means for preventing ringing of wheels, such as gear wheels.

In the prior art, many attempts have been made to silence gear wheels by attaching non-sonorous material to the webs of the wheels or by providing hollow webs which may be filled with fluid or other material which will damp vibrations.

Gear wheels have also been made in several parts with inserts of non-sonorous material interposed between the rims and hub portions.

However, such devices have been found to be expensive, difficult to form accurately and not capable of withstanding severe service, such as is encountered by gear-wheels utilized in railway vehicles.

An object of this invention is, generally stated, to provide simple and inexpensive means which may be readily applied to a gear wheel for the purpose of preventing ringing and objectionable vibrations.

Another object of the invention is to provide means for damping the vibrations of the rim of a gear wheel that are capable of withstanding any service to which the wheel may be applied.

In the present invention, rings of cast iron or other material are applied to the wheel rim in such manner that objectionable vibrations are effectively prevented, and the resulting structure is made rugged and inexpensive.

In order to accomplish these, as well as other objects of the invention that will become apparent upon studying this specification, the silencing means may be applied to a standard gear wheel, as shown in the accompanying drawings, in which:

Figure 1 is a view, in elevation, of a gear wheel provided with silencing rings in accordance with the invention, Fig. 2 is a view, in cross section, of the gear wheel taken along the line II—II of Fig. 1, Fig. 3 is a diagram showing, in an exaggerated manner, the limiting positions assumed by a wheel rim when vibrating in its fundamental mode, Fig. 4 is a view, in end elevation, of a gear wheel embodying a somewhat modified form of the invention, and Fig. 5 is a fragmentary view, in section, of the gear wheel taken along the line V—V of Fig. 4.

As shown in the drawings, a standard gear wheel 1 comprises, in general, a central portion provided with a hub 2 that is disposed to support a rim portion 3 by means of an interconnecting web portion 4. In the particular structure shown, the web portion 4 is formed integrally with the hub portion 2 and the rim portion 3 and is disposed in the central transverse plane of the wheel. Ordinarily, such gear-wheels are forged from a single piece of steel or they may be formed by suitably machining a solid steel blank.

For the purpose of mounting the gear wheel 1 on a shaft 5, the hub portion 2 is provided with a centrally disposed opening 6. The inner surface of the opening 6 may be provided with a key-way 7 which may be aligned with a similar key-way 8 in the shaft 5 for receiving a key 9 that is inserted for rigidly securing the gear wheel 1 to the shaft 5. The outer periphery 10 of the gear rim 3 is provided with gear teeth 11, in the usual manner, for mating with a cooperating pinion (not shown).

It is well known that gear wheels emit ringing sounds when in operation, especially when operating at light loads. By means of sound-analyzing devices, it has been determined that the sound emitted by a gear-wheel, when in operation, corresponds, in frequency, to the natural frequency of vibration of its rim. It, therefore, may be reasonably assumed that the objectionable vibrations arise within the rim portion of the wheel instead of in the relatively thin web portion, as heretofore commonly supposed.

Upon further study, it was found that the rim of the gear-wheel vibrates, in its fundamental mode in four loops and four nodes, as shown in Fig. 3, by first assuming the shape of an ellipse 12 having a major axis 13, then returning to a circular shape and passing to the shape of an ellipse 14 having a major axis 15 which extends at right angles to the first major axis 13.

It has also been determined that the natural frequency of vibration of gear-wheels is usually well within the audible range of sound frequency. Also tests have been made which indicate that this condition cannot be overcome by changing the dimensions of the gear-rim or by reenforcing or otherwise strengthening it.

In accordance with the present invention, the objectionable vibrations may be prevented by applying to the gear rim 3 a plurality of silencing rings 16 of material other than that of the rim. By experiment, it has been found that materials, such as lead, babbitt or cast iron, are most effective in preventing the ringing of gear-wheels. In accordance with the information now available, it is believed that the effectiveness of the damping materials arises from the fact that they have a high degree of internal friction which absorbs the energy of vibration of the gear wheel 1 and prevents the energy from being radiated as sound.

For severe service, such as railway-vehicle driving mechanisms must withstand, cast-iron rings are preferable, inasmuch as they are more rugged and less likely to become loosened from the gear wheel than are rings of lead or other relatively soft material.

In order to provide means for receiving the vibration-damping devices 16, the inner surfaces 17 of the rim member 3 on the sides of the web portion 4 are machined to a smooth finish. As shown in Figs. 2 and 5, the silencing devices 16 comprise a pair of cast-iron rings that have their outer peripheries machined to contours similar to the inner surfaces 17 of the gear rim 3 in order that they may be pressed into intimate and continuous engagement therewith. For the purpose of securely fastening the rings 16 within the rim 3, corresponding notches 18 and 19 may be cut in the rim 3 and the rig 16, respectively, and the recesses thus provided may be filled with a deposit of metal 20, as shown in Figs. 1 and 2, by means of a welding operation.

In Figs. 4 and 5 is shown a modified means for securing the rings 16 within the gear rim 3. As here shown, the peripheries of the rings 16 are turned to approximately the diameter of the inner surface 17 of the rim 3 and the ring is then sawed or otherwise cut at one place 21 to present ends 22. The ring 16 may then be readily placed in its proper position within the gear rim 3 and forced into close contact with the inner surface 17 by inserting a wedge or other suitable tool between the ends 22 presented at the cut portion 21. In order to hold the ring 16 in place, a small amount of metal 23 may then be deposited between the ends 22 of the ring by means of a welding process. The wedge or other tool may then be withdrawn and the entire opening between the ends 22 of the ring may be filled by means of deposited metal 23, in order to securely fasten the ring in place. It has been found that the latter method of securing the ring within the gear rim is preferable, inasmuch as it obviates the necessity of accurately machining the outer periphery of the ring 16 and the inner surface 17 of the rim 3 to insure a tight press fit.

From a consideration of the foregoing description and explanation of the operation of the sound-damping means, it is obvious that the invention provides an inexpensive, rugged and efficient means for preventing the ringing of gear wheels.

Although I have described specific embodiments of my invention, it will be obvious to those skilled in the art that silencing means of various materials and shapes may be substituted for the damping rings shown and described without departing from the spirit and scope of the invention, as defined in the appended claims.

I claim as my invention:

1. A silencing device for wheels that comprises an annulus of material other than the material of the wheel to be silenced, said annulus being disposed in contact with the inner surface of the wheel rim, and secured to the wheel rim only.

2. A gear wheel comprising an integral steel forging constituting the usual hub, web and rim members, gear teeth on the periphery of the rim and cast-iron annular members secured to the inner surface of the gear rim at the sides of the web for the purpose of silencing the gear wheel, when in operation.

3. A gear wheel comprising a hub, a rim, a web formed integrally with the hub for connecting it to the rim and a discontinuous annulus of metal secured by welding within the rim for preventing the ringing sound that is ordinarily produced when the gear wheel is in operation.

4. A wheel comprising a steel member constituting integrally formed hub, web and rim portions, and a cast-iron member mounted on the rim in such manner that it prevents substantially all audible vibration of the rim.

5. A wheel comprising a hub portion, a web portion mounted on the hub, a steel rim portion carried by the web and two cast-iron rings secured within the rim portion for the purpose of deadening the rim to prevent ringing, said cast-iron rings being disposed coaxially with respect to the rim and at the sides of the web portion.

6. A wheel comprising an integral steel member constituting the usual hub, rim and web portions and an annulus of cast iron of outer diameter substantially equal to the inner diameter of the gear rim, said annulus being secured within the rim for the purpose of deadening it to prevent ringing when in operation.

7. A wheel comprising steel hub, rim and web portions formed integrally and a pair of cast-iron annulii disposed to bear against the inner surface of the rim portion at positions at the sides of the web portion.

8. A wheel comprising steel hub, rim and web portions formed integrally and a pair of cast-iron annulii disposed to have their peripheries in continuous engagement with the inner surface of the rim at the sides of the web portion for the purpose of deadening the wheel to prevent ringing.

9. A silencing device for wheels that comprises an annulus of material having internal friction higher than the internal friction of the material of the wheel to be silenced, said annulus being disposed in contact with the inner surface of a wheel rim, and secured to the wheel rim only.

10. The combination with a wheel comprising the usual hub, web and rim portions, of sound-damping means comprising a ring of material having high internal friction carried by the wheel and disposed to have its periphery in engagement with the inner surface of the wheel rim, and secured to the wheel rim only.

11. In a wheel structure, in combination, a hub portion, a rim portion carried by the hub portion and sound-deadening means comprising a cast-iron ring pressed inside of the rim portion and secured by welding.

12. The combination, in a wheel structure, of a hub portion, a rim portion and means for supporting the rim portion on the hub portion, of means for preventing ringing of the wheel, said means comprising rings of cast iron expanded into intimate engagement with the inner surface of the rim portion and secured by welding.

13. A gear wheel comprising a center member, a rim carried by the center member, said rim having predetermined vibrating characteristics, and a silencer carried by the gear wheel and secured to the rim only, said silencer being capable of resisting distortion in every direction and having vibrating characteristics different from the rim.

14. In a gear wheel, in combination, a center member provided with a hub, a rim carried by the center member and a silencing member disposed on the gear wheel to prevent vibrations of the rim, said member being in continuous engagement with the rim but secured to the rim at predetermined positions only.

15. A device for silencing wheels that comprises a discontinuous annulus of iron that is secured to the rim of a wheel.

16. A device for silencing wheels which comprises a metallic annulus having a section removed to present ends and secured in engagement with the inner surface of the rim of a wheel to be silenced.

17. A silent gear-wheel that comprises a hub, a rim carried by the hub and a split ring disposed in engagement with the inner surface of the rim.

18. A silent gear-wheel that comprises a hub, a rim carried by the hub and a split ring disposed in engagement with the inner surface of the rim, said ring being secured to the rim by welding at its ends only.

19. A silent wheel comprising a hub, a rim carried by the hub and an annulus, having a section removed to present ends, carried by the rim, said annulus being secured to the rim by expanding it into engagement therewith and by welding the ends to the rim.

20. A wheel comprising an integral steel member constituting the usual hub, rim and web portion and an annulus of iron having an outer diameter substantially equal to the inner diameter of the gear rim, said annulus being secured within the rim for the purpose of deadening it to prevent ringing while in operation.

21. A gear wheel comprising an integral steel member constituting hub, web and rim portions and a silencing device comprising a discontinuous ring of metal having an outer diameter equal to the inner diameter of the rim portion and presenting adjacent ends, said ring being secured in position by separating the ends to expand the ring and by welding the separated ends to the rim.

22. The method of constructing a silent gear wheel which comprises expanding a discontinuous annulus of metal into engagement with the inner surface of the gear rim and welding the ends of the discontinuous annulus to the gear rim.

In testimony whereof, I have hereunto subscribed my name this 11th day of September, 1928.

RUDOLPH E. PETERSON.